Nov. 26, 1957

H. N. BLISS

REGISTER 2,814,444

Filed Dec. 14, 1953

6 Sheets-Sheet 1

INVENTOR
HARVEY N. BLISS
BY
Lindsey and Prutzman
ATTORNEYS

Nov. 26, 1957 H. N. BLISS 2,814,444

REGISTER

Filed Dec. 14, 1953 6 Sheets-Sheet 2

INVENTOR.
HARVEY N. BLISS

BY

Lindsey and Prutzman
ATTORNEYS

INVENTOR
HARVEY N. BLISS

BY

Lindsey and Prutzman
ATTORNEYS

Nov. 26, 1957 H. N. BLISS 2,814,444

REGISTER

Filed Dec. 14, 1953 6 Sheets-Sheet 4

INVENTOR.
HARVEY N. BLISS
BY
Lindsey and Prutzman
ATTORNEYS

Nov. 26, 1957 H. N. BLISS 2,814,444

REGISTER

Filed Dec. 14, 1953 6 Sheets-Sheet 5

INVENTOR.
HARVEY N. BLISS

BY

Lindsey and Prutzman
ATTORNEYS

Nov. 26, 1957 H. N. BLISS 2,814,444

REGISTER

Filed Dec. 14, 1953

6 Sheets-Sheet 6

INVENTOR.
HARVEY N. BLISS

BY

Lindsey and Prutzman

ATTORNEYS

United States Patent Office 2,814,444
Patented Nov. 26, 1957

2,814,444

REGISTER

Harvey N. Bliss, Windsor, Conn., assignor to Veeder-Root, Incorporated, Hartford, Conn., a corporation of Connecticut Application December 14, 1953, Serial No. 398,045

33 Claims. (Cl. 235—94)

The present invention relates generally to registers or counters and is concerned more particularly with a counter or register of novel construction and having improved resetting means.

This invention has particular application to counters or registers employing a plurality of groups of indicating wheels and wherein, if desired, more than one quantity may be counted or registered. A typical example of the use of such a counter or register is in the gasoline dispensing field where it is desired to count or register both the quantity of liquid dispensed and the cost thereof. In such installations, the indicators of the counter or register are adapted to be driven by a meter, a change speed mechanism set in accordance with the prevailing price per gallon being employed to provide the proper ratio between the drives to the cost and quantity wheels. In the dispensing of gasoline, it is the preferred operating procedure, of course, to reset the indicators to zero after one transaction is completed and before the start of a second dispensing operation.

It is an aim of the present invention to provide a counter or register of the type described which will be effective and accurate in its registering or counting function and which at the same time may be reset in a convenient and easy manner. Included in this aim is the object of providing a structure having a simple and economical arrangement of parts which may be advantageously manufactured and assembled commercially and which will operate satisfactorily over long periods of time, even under adverse conditions.

Insofar as the resetting feature is concerned, it is an aim of the invention to provide a novel resetting mechanism requiring a minimum of energy input for full operation even when applied to a plurality of groups of indicators, thus permitting the use of simplified actuating means and adapting the mechanism for semi-automatic operation, if desired. Included in this aim is the object of providing a register or counter particularly adapted for the gasoline dispensing field which can be conditioned for operation by a minimum of movements on the part of the operator, thus simplifying a dispensing operation and saving time and effort.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
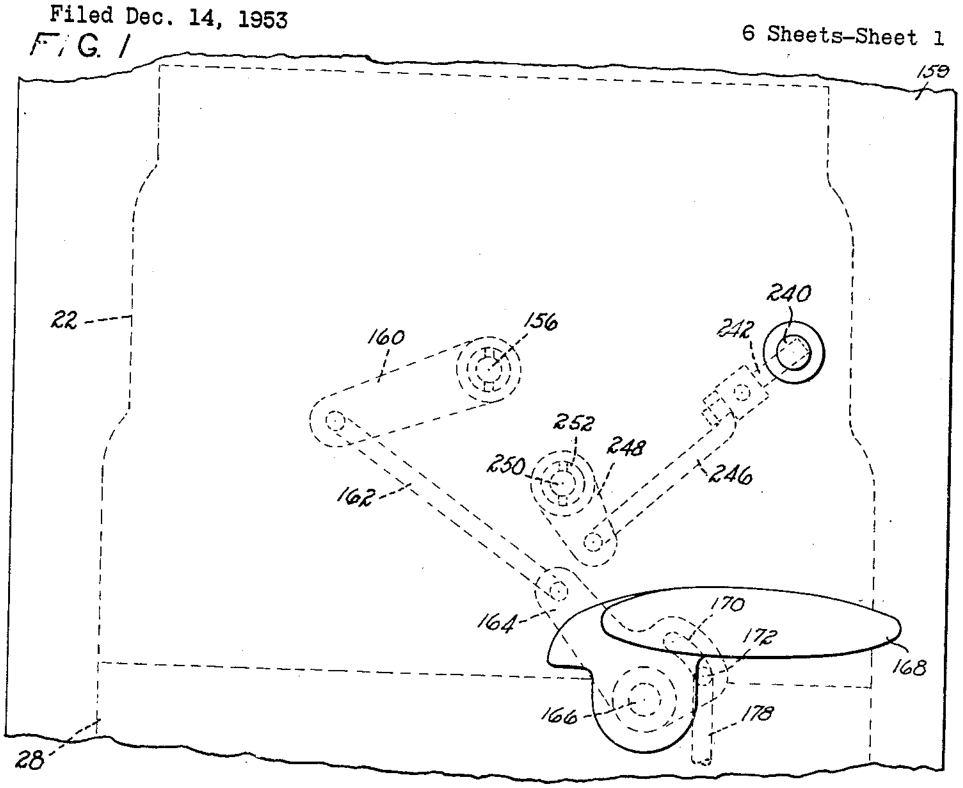
Figure 1 is a fragmentary side view of a gasoline dispensing apparatus showing the manual control means on the exterior of the casing which are to be actuated by the operator.

Referring to the drawings, and particularly Figures 2 to 7 thereof showing a register of the type particularly adapted for use in gasoline dispensing apparatus, it will be seen that the register or counter is mounted on a frame consisting of side plates 10 held in spaced-apart relationship by spreader bars 12. In this particular embodiment, the frame has slidably journaled therein four axially movable horizontal wheel-supporting shafts 14, 16, 18 and 20, the shaft 14 having mounted thereon a set of rotatable number wheels for registering the cost of the gasoline dispensed, these wheels being hereinafter referred to as the cost wheels C. Similarly mounted on the shaft 16 is a group of number wheels which are utilized to register the quantity of the gasoline dispensed, which group of wheels is hereinafter referred to as the quantity wheels Q. In this type of apparatus, it is desired to provide a duplicate indication at opposite ends of the register so that the operator or customer may read the indication from either side of the dispensing apparatus. Accordingly, the shaft 18 is provided with a set of number wheels corresponding to the cost wheels C, and these will be referred to hereinafter as the cost wheels C′. In like manner, the shaft 20 has mounted thereon a group of number wheels for registering the quantity of gasoline dispensed, which correspond to the quantity wheels Q, and these will be referred to hereinafter as the quantity wheels Q′.

Figure 2:
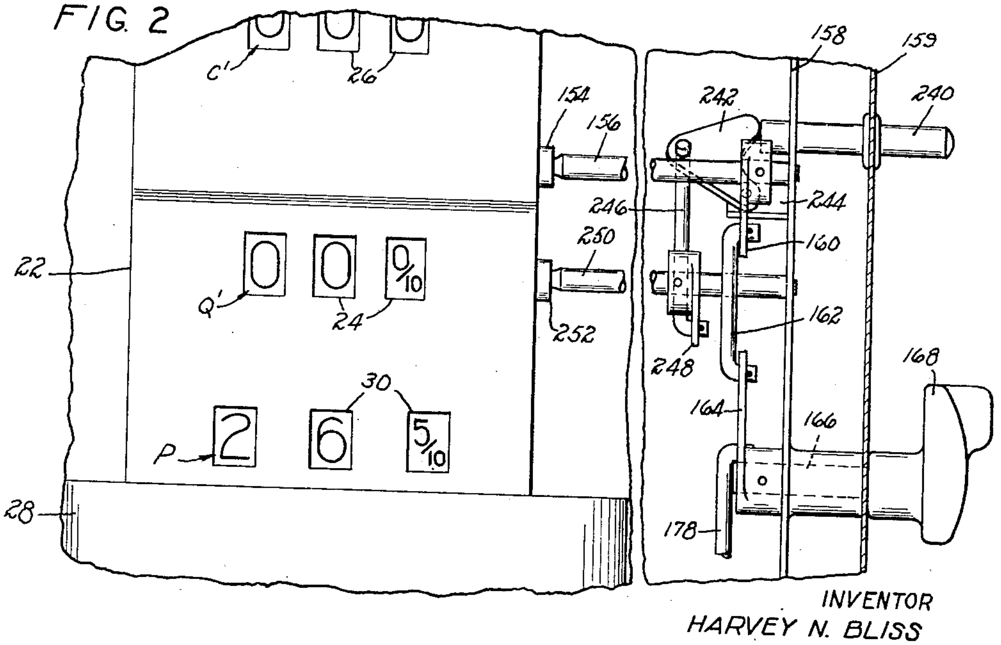
Figure 2 is a fragmentary side view taken 90 degrees from the side view of Figure 1 and partially in cross section to show the connections between the operating controls and the register within the pump casing.

As shown in Figure 2 of the drawings, the completely assembled register, as installed in a gasoline dispensing apparatus, is preferably provided with a protective cover 22 which is a generally box-like housing having windows 24 situated in registry with the quantity wheels Q′ so as to expose the reading line thereof to view, and provided with windows 26 situated in registry with the cost wheels C′ to similarly expose the cost wheels C′ to view. Although not shown in the drawings, it will be understood that the cover 22 has similar groups of windows at the opposite end for cooperation with the cost wheels C and quantity wheels Q.

As will be discussed more fully hereinafter, the register or counter when used in a dispensing apparatus is adapted to be associated with a speed change mechanism or variator indicated diagrammatically at 28 in Figure 2 of the drawings. The number wheels P shown in Figure 2 are associated with the variator mechanism and indicate the price per gallon of the liquid being dispensed, the variator 28 being set in accordance with such price to produce the proper speed ratio between the drives to the cost wheels and quantity wheels respectively. The number wheels P are exposed to view by means of windows 30 in the cover 22.

Figure 3:
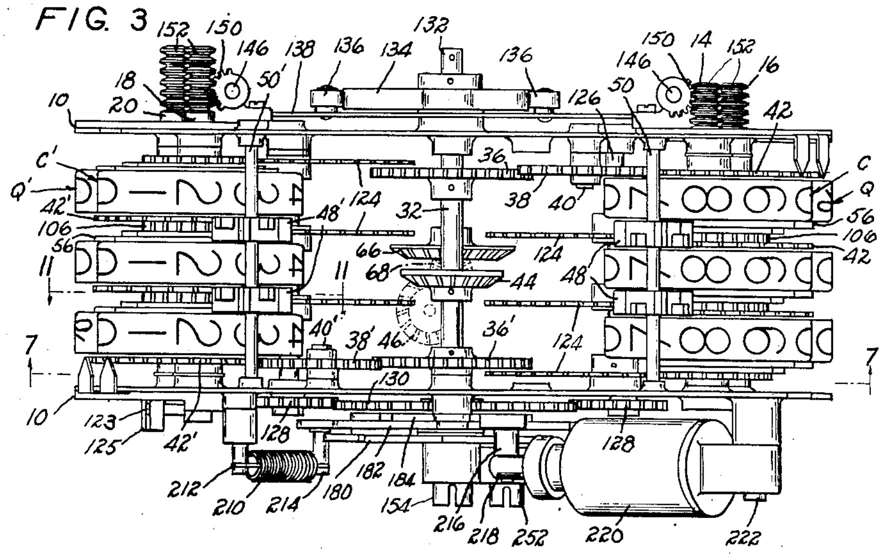
Figure 3 is a plan view of the counter or register with the casing removed.
Figure 7:
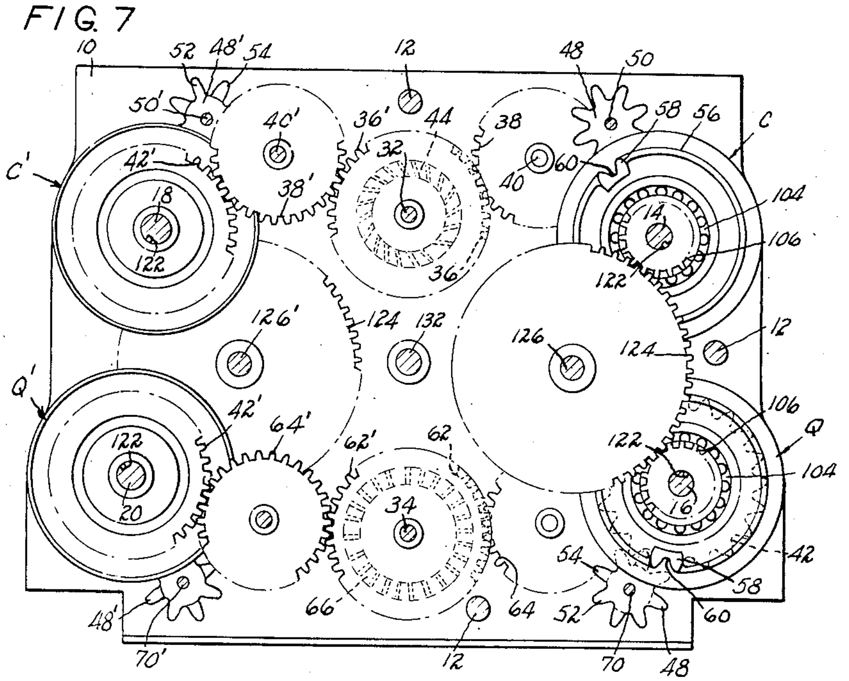
Figure 7 is a cross-sectional view taken along the line 7—7 of Figure 3.

The manner in which the cost wheels C, C' and the quantity wheels Q, Q' are driven in order to register the cost and quantity of the liquid dispensed is best shown in Figures 3 and 7 of the drawings. Referring to these figures, it will be seen that there is rotatably mounted midway between the ends of the frame an upper cross shaft 32 and a lower cross shaft 34. The upper cross shaft 32 has fixed thereto adjacent the ends of the shaft a pair of gears 36, 36' which mesh with idler gears 38, 38' mounted on studs 40, 40', which are respectively mounted in the opposite side plates 10. The idler gears 38, 38' are in mesh with the driven gears 42, 42' which are connected, respectively, to the wheel of lowest order of the cost wheels C and C' in a manner to be more particularly described hereinafter. The shaft 32 has fixed thereto, intermediate its ends, a bevelled gear 44 which meshes with a bevelled gear 46 shown in phantom in Figure 3 and which is mounted on the output shaft of the variator 28. The variator 28 is not shown in detail because it forms no part of the present invention and may be of any suitable type such as that illustrated in the patent to Edward A. Slye, No. 2,111,996, granted March 22, 1938. It thus will be seen that the unit wheels of the cost wheels C and C' will be driven in unison from the variator 28 at a speed commensurate with the price of the quantity of gasoline being dispensed.

Figure 11:
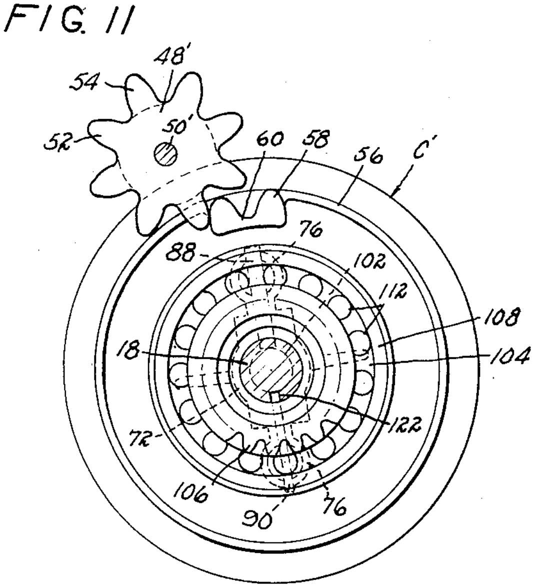
Figure 11 is a cross-sectional view taken along the line 11—11 of Figure 3.

In the specific embodiment shown, each of the number wheels of the groups of cost wheels C and C' is provided about its periphery with indicia consisting of the numerals 0 to 9 inclusive, and it is the intention that for each complete revolution of a number wheel of lower order, the wheel of next higher order will be rotated one-tenth revolution. The transfer mechanism for transferring the count from the wheels of lower order to the wheels of higher order is somewhat conventional and includes the use of transfer pinions 48, 48' rotatably mounted on transverse shafts 50, 50' respectively. The transfer pinions 48, 48' are formed with alternate wide teeth 52 and narrow teeth 54. The wide teeth 52 cooperate with a locking ring 56 formed on the side of each of the number wheels and which prevents the transfer pinion from turning except during a transfer operation. As best shown in Figure 11 of the drawings, upon each rotation of the wheel of lower order, the transfer pinion is engaged by a two-toothed driving gear 58 on the wheel of lower order and situated adjacent a gap 60 in the locking ring, which operates to impart a partial rotation to the transfer pinion. The transfer pinion also meshes with the driven gear 42 of the number wheel of next higher order, thus advancing the number wheel of higher order one-tenth revolution each time the transfer pinion is actuated.

Turning now to the gear train for driving the quantity wheels Q, Q', it will be seen that the number wheels of lowest order of the quantity wheels Q, Q' are driven in similar manner by gears 62, 62' on opposite ends of shaft 34 which engage idler gears 64, 64' which in turn mesh with the driven gears 42, 42' of the number wheels of lowest order of the quantity wheels. The shaft 34 is rotated by means of a bevelled gear 66 fixed intermediate the ends of shaft 34 and meshing with a bevelled gear 68 shown in phantom in Figure 3 and which is mounted on a shaft driven without any variable speed change by the meter (not shown). As is well known, there is employed in gasoline dispensing apparatus a meter through which is passed the gasoline dispensed and which is rotated thereby in an amount commensurate with the quantity of gasoline dispensed. The meter is utilized to drive the quantity register directly, while the drive to the cost register is through the variator which changes the speed of rotation in accordance with the price per gallon of the liquid dispensed.

The means to transfer the count of the wheels of lower order to the wheels of higher order in the groups of wheels Q, Q' whereby each wheel of higher order will be rotated one-tenth revolution for each complete revolution of the preceding wheel of lower order is the same as in the case of the cost wheels and for this purpose there are provided the transfer pinions 48, 48' mounted on transverse shafts 70 and 70', the operation being the same as previously described in connection with the cost wheels C, C'.

In accordance with the invention, the counter or register is provided with number wheels of novel construction as best shown in Figures 8 to 11 of the drawings. Referring to these figures, it will be seen that each wheel has a hub 72 in which is formed a throughbore for accommodating the wheel-supporting shafts 14, 16, 18 and 20, the hubs being rotatable and slidable relative to the shafts. Each hub 72 is provided with a side wall 74 and radiating webs 76 on which is mounted a cylindrical rim 78 bearing the numerals or indicia hereinbefore referred to. The outer portion of the side wall is integrally formed with the driving gear 58 and locking ring 56 previously referred to for cooperation with the transfer pinions.

Mounted on the hub 72 on the opposite side of the side wall 74 is the driven gear 42' which is freely rotatable on the hub, although it is held in place axially by means of a ring 80. The driven gear 42' is formed with an inwardly projecting annular ridge 82 in which is formed a frusto-conical band of fine V-shaped serrations or teeth 84. A pair of radially opposite webs 76 of each wheel is slotted as indicated at 86 for accommodating a pivoted driving pawl 88 and a pivoted resetting pawl 90.

Figure 8:
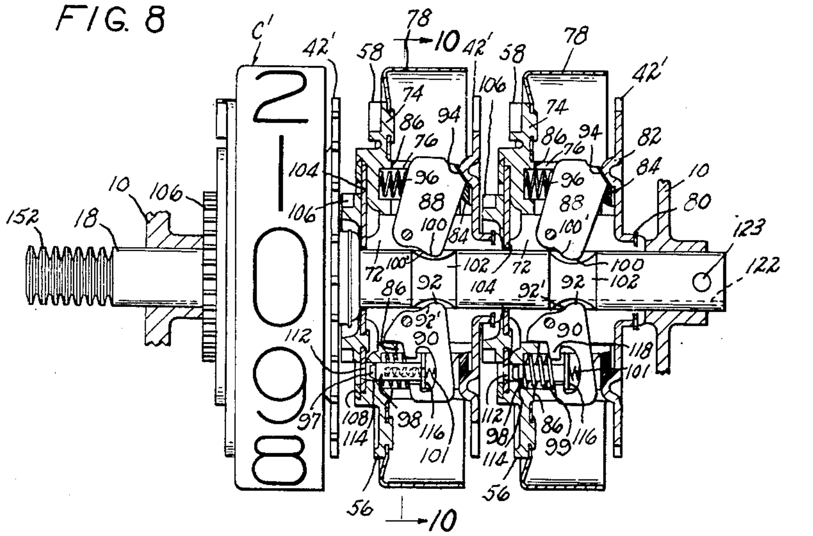
Figure 8 is a cross-sectional view taken along the line 8—8 of Figure 4.
Figure 9:
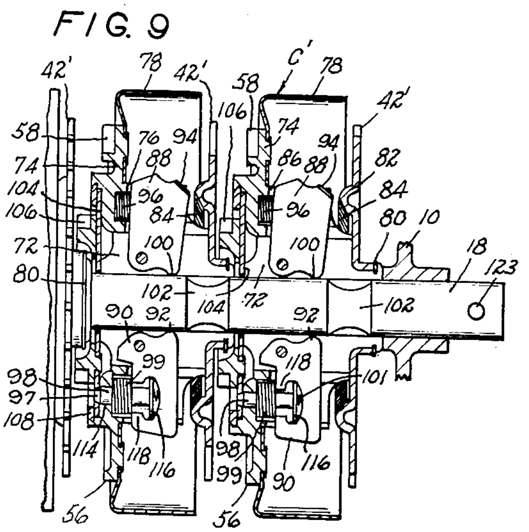
Figure 9 is a partial cross-sectional view similar to the cross-sectional view of Figure 8 with the wheel supporting shaft in retracted position.
Figure 10:
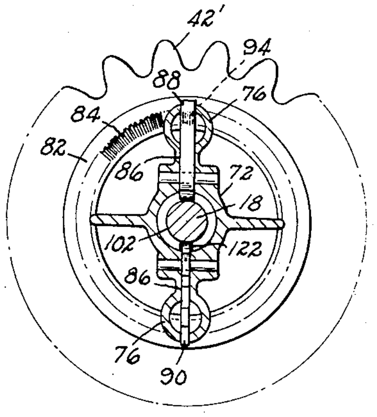
Figure 10 is a cross-sectional view taken along the line 10—10 of Figure 8.

Dealing first with the pivoted driving pawl 88, it will be noted that it is in the form of a flat piece pivoted at one end to the hub for swinging movement in a radial plane which includes the longitudinal axis of the wheel. The free or outer end of the pawl is provided at its extreme end with a number of fine V-shaped serrations or teeth 94 which are complementary to and which are adapted to engage with the band of teeth 84 on the driven gear. The pawl is normally urged into cooperative engagement with the teeth 84 of the driven gear by a compression spring 96 extending between the pawl and the side wall 74. Each of the pawls 88 has adjacent its pivoted end a lobe or projection 100 adapted to extend into the bore of the hub 72 for engagement with the supporting shaft. Each supporting shaft is provided with a series of circumferential grooves 102 (one for each wheel) which freely accommodate these lobes when the shafts are in registering position as shown in Figure 8, the supporting shafts being axially shiftable as previously mentioned. When the supporting shaft is in the position shown in Figure 8 so that no pivoting force is applied to the lobe 100 of the pawl by the supporting shaft, the pawl is engaged with the teeth 84 of the driven gear so that a positive driving engagement is obtained between the driven gear and the wheel. When the supporting shaft is shifted to the right as indicated in Figure 9 of the drawings, the lobe 100 of the pawl rides up on the periphery of the shaft, thus pivoting the pawl and disengaging it from the driven gear, thus freeing the wheel from its driving gear and conditioning the wheel for a resetting operation.

Turning now to the pivoted resetting pawl 90, it will be seen that the pawl 90 is generally similar to the pawl 88 in that it also is formed of a flat piece pivoted at one end to the hub for swinging movement in a radial plane which includes the longitudinal axis of the wheel. The pawl 90, however, is made somewhat thinner than the pawl 88 for the reason to be explained more fully hereinafter. Like the pawl 88, pawl 90 has a lobe or projection 92 adjacent its pivoted end which also extends into the bore of the hub 72 for engagement with the supporting shaft or a circumferential groove 102 depending on the shifted position of the supporting shaft.

Each pawl 90 has associated therewith a plunger 98 which is axially slidable in a bore 114 in the side wall 74. The inner end of the plunger 98 has a head 116 which is embraced by the finger-like projections 118 of the pawl 90. The pawl 90 is urged in a counterclockwise direction as viewed in Figures 8 and 9 by reason of a spring 99 extending between the side wall 74 and the pawl and surrounding the plunger 98. The plunger is urged outwardly of the wheel relative to the pawl by means of a spring 101. As a result of this construction, the pawl 90 is normally urged in a counterclockwise direction so that, when its lobe or projection 92 is received in the circumferential groove 102, it will draw in the plunger 98. Conversely, when the pawl 90 is shifted in a clockwise direction by shifting of the supporting shaft, the plunger 98 is free to move outwardly under the influence of spring 101.

Rotatably mounted on the outer side of each of the side walls 74 is a disc 104 having fixed thereto a gear 106. The disc 104 is rotatably supported within the locking ring 56 and is retained axially by means of a retaining ring 108 also supported within the locking ring, the edge of the locking ring being peened over to engage and hold the retaining ring 108. The disc 104 is provided with a plurality of holes 112 (fifteen holes in the specific embodiment) which are circularly arranged at a distance from the axis of the wheel such that they may be brought into registry with the plunger 98 which, as previously mentioned, is associated with the pawl 90. The result is that when the wheel supporting shaft is shifted axially to pivot the pawl 90 in a clockwise direction, the wheel may be picked up and rotated by rotating the gear 106. In the event one of the holes 112 in the disc 104 is not lined up with the plunger 98 when the pawl 90 is shifted, the plunger 98 will not move, but instead will merely further compress the spring 101. However, as soon as any rotation is applied to the disc 104 by rotating the gear 106 one of the openings 112 will quickly be brought into registry with the plunger 98 and the spring 101 will move the plunger 98 outwardly into engagement therewith.

A very important feature of the specific embodiment shown in the drawings is that the outer end of the plunger 98 is bevelled or chamfered at a slight angle to form a frusto-conical engaging portion 97, and, in similar fashion, the openings 112 in the disc 104 are given a similar frustoconical shape. A bevel at an angle to the axis of the hole 112 and plunger 98 of approximately 15° has been found to be preferred, since at materially greater angles there is a tendency for the driving disc 104 to cam the plunger 98 inwardly and thus disengage the number wheel, and when the angle is materially smaller, there is a tendency for the plunger and the disc opening to bind. Engagement between the plunger 98 and the opening 112 of the disc 104 is only in the bevelled portion referred to.

As previously mentioned, the supporting shaft during a resetting operation is in the shifted position shown in Figure 9, so as to disengage the number wheels from the driven gears and so as to permit each of the wheels to be picked up by its associated disc 104 upon rotation of the resetting gears 106, whereupon the wheels may be returned to zero position upon continued rotation of the gears 106. The wheels are stopped and held upon return to the zero position in a resetting operation by means of a properly located longitudinal slot 122 in each of the supporting shafts. The longitudinal slot 122 is sufficiently wide and deep to accommodate the lobes 92 of the pawls 90 when the pawls are in radial alignment therewith. As will be appreciated, as soon as the wheels are rotated to the position where the lobes of the pawls 90 fall into the slot 122, the pawl immediately withdraws its associated plunger 98 from the disc 104, thus interrupting any further resetting movement of the number wheel and holding the wheel in zero position even though further additional turning movement may be applied to the associated gear 106 and hence the disc 104. As previously mentioned, the pawl 88 being thicker than the pawls 90 will ride over and not engage in the longitudinal slot 122 and thus will not interfere with the resetting operation.

The longitudinal slot 122 in each of the wheel-supporting shafts is accurately positioned in relation to the pawls 90 of the number wheels so that, when the pawls engage in the slots, the wheels will be in exact zero position. The supporting shafts, although mounted for axial shifting movement, are retained against any rotational movement by pins 123 (see Figures 3 and 4) fixed on the outer ends of the shafts and which are slidably received between ears 125 formed in the side plate of the frame. During a resetting operation, the discs 104 are rotated at least one turn and preferably one turn plus a fraction to insure that all of the wheels will be picked up and returned to zero position. Since the number wheels are completely disengaged from their driven gears during a resetting operation, no inaccuracies as a result of backlash will occur, regradless of the direction of resetting.

At the completion of the resetting operation, the supporting shaft may then by shifted to the original position shown in Figure 8 of the drawings to cause the pawls 88 to re-engage with the driving gears and to disengage the lobes 92 of the pawls 90 from the longitudinal slot 122, thus conditioning the counter for a subsequent counting operation.

It is an important feature of the specific embodiment shown in the drawings that the lobes of the pawls 88 and 90 are constructed to produce a slight differential action in the shifting movements of the pawls 88 and 90. Referring to the drawings, and particularly Figures 8 and 9, it will be noted that the leading edge of the lobe 100 of the pawl 88, which is indicated at 100′, is located slightly to the left, as viewed in Figures 8 and 9, of the corresponding leading edge 92′ of the lobe 92 on the pawl 90. The result is that, when the supporting shaft is moved to the right as viewed in Figures 8 and 9, in order to condition the apparatus for a resetting operation, the pawl 88 will begin to pivot slightly in advance of the pivoting of the pawl 90, thus insuring that the number wheel will be declutched from its driving gear before the pawl 90 will have any opportunity to engage in the longitudinal slot 122. This arrangement prevents any breakage in case the shaft is shifted while a registering operation is in progress.

In order to impart turning movement to the gears 106 for resetting purposes, each of the gears 106 is meshed with one of the gears 124 which are fixed to transverse shafts 126, 126′. The shafts 126, 126′ protrude through the side plate 10 shown in Figure 4 and are provided at their outer ends with pinions 128 which mesh at opposite sides with the spur gear 130 which is rotatably mounted on the main reset shaft 132. As explained more fully hereinafter, the gear 130 is turned under the control of the operator in order to reset all of the number wheels to zero in one operation.

Figure 5:
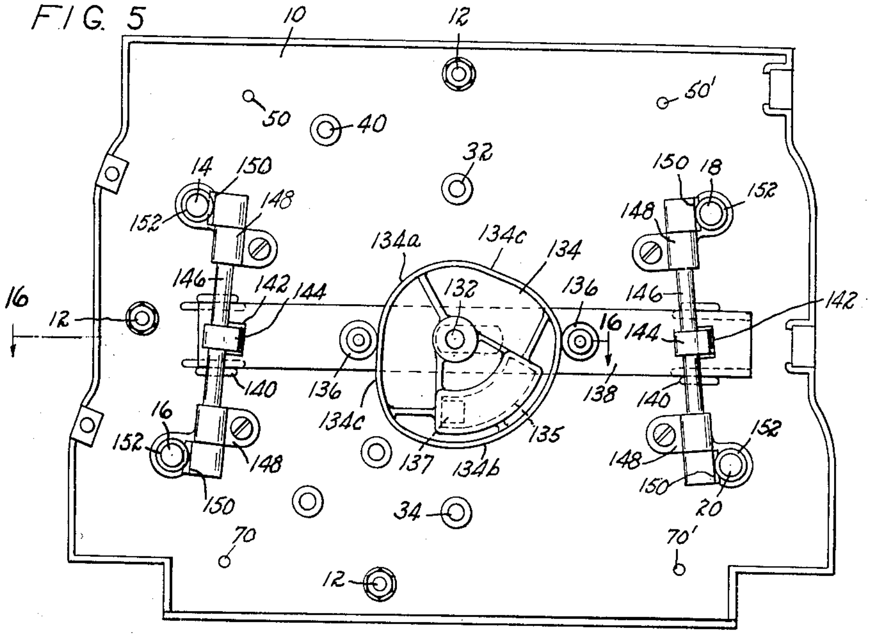
Figure 5 is a similar side view taken from the side of the register opposite from that shown in Figure 4.
Figure 6:
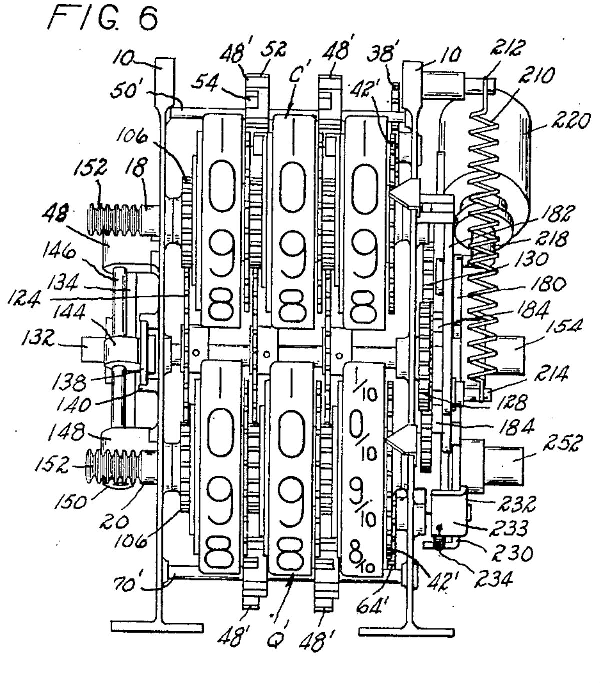
Figure 6 is an end view of the register with the cover removed.

The shifting of the wheel-supporting shafts 14, 16, 18 and 20, in order to condition the register for a resetting operation or to recondition it for a registering operation, is accomplished by a mechanism disposed on the exterior of the opposite side plate 10 shown in Figure 5 of the drawings. As shown in Figure 5, there is fixed to the main reset shaft 132 a cam 134 of which a segment 134*a* is of smaller radius and a second segment 134*b* is of larger radius, the segments being interconnected by inclined camming surfaces 134c. The cam 134 cooperates with a pair of rollers 136 mounted on a slide 138 slidably mounted at its opposite ends on ears 140 provided on the side plate. The arrangement is such that, as the cam 134 is turned approximately 70° in a clockwise direction as viewed in Figure 5, the camming surfaces 134c will come into play and move the slide 138 to the left, and conversely, when the cam is returned in a reverse direction, the slide will be moved to the right and returned to original position. An arcuate slot 135 in the cam 134 accommodating a stop 137 projecting from the frame limits rotation of the cam 134 and acts as a safety stop in the event the operator attempts to turn the shaft 132 too far. The opposite ends of the slide 138 are formed with notches 142 for accommodating and engaging the tails of pawls 144 which are fixed to upright shafts 146 journaled as at 148 at opposite ends on the side plate. The extremities of the shafts 146 are provided with gear segments 150 meshing with a series of circumferential teeth 152 on the adjacent protruding ends of the wheel-supporting shafts 14, 16, 18 and 20. Consequently, when the main reset shaft 132 is in the position shown in Figure 5 of the drawings, which is the registering position, the wheel-supporting shafts 14, 16, 18 and 20 are retained in the position shown in Figure 8 of the drawings, the number wheels then being engaged with their respective driven gears. However, when the main reset shaft is rotated to the other position, the slide 138 is shifted to the left from the position shown in Figure 5 of the drawings, causing rotation to be applied to the upright shafts 146 which in turn axially shift the wheel-supporting shafts 14, 16, 18 and 20 to the position shown in Figure 9 of the drawings, whereupon the number wheels are disengaged from their respective driven gears and are in condition for resetting.

It will be noted, particularly by reference to Figures 2, 5 and 7 that the shafts 14 and 18 which carry the cost wheels C and C′ are disposed nearer to the center of the register than are the shafts 16 and 20 which carry the quantity indicators Q and Q′. In other words, the cost wheels and quantity wheels are not in vertical alignment but instead the axes of the cost wheels are set back from the axes of the quantity wheels. This has been done for a definite purpose, namely, to improve the illumination of the quantity wheels when the face of the counter is illuminated from above.

Figure 16:
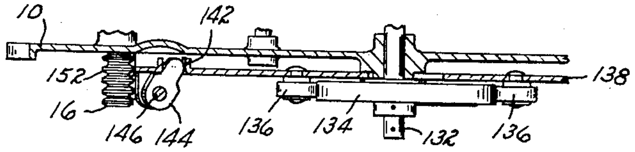
Figure 16 is a cross-sectional view taken along the line 16—16 of Figure 5.

Because of the vertical disalignment of shafts 14 and 18 on the one hand and shafts 16 and 20 on the other, it is necessary to incline the shafts 146 extending therebetween at an angle as best shown in Figure 5. Although the shafts 146 tilt inwardly as viewed in Figure 5 and therefore do not extend at right angles to the slide 138, the transfer of longitudinal movement of the slide 138 to rotary motion of the shafts 146 is accomplished smoothly and efficiently without binding, in accordance with the invention, by inclining the slots 142 so that they are disposed at right angles to the shafts 146, while at the same time the tails of pawls 144 which are engaged therein are made narrower than the slots and are rounded in configuration somewhat resembling a gear tooth, as best shown in Figure 16. As a result, the tails of pawls 144 can turn and also slide vertically in the slots 142 to impart rotary movement to the shafts 146 without binding or undesirable lost motion.

It will be apparent from the preceding description that, in order to reset the register, all that it is necessary for the operator to do is to turn the main reset shaft 132 sufficiently to cause shifting of the number wheel supporting shafts and then impart rotation to the spur gear 130 which in turn will cause rotation of the gears 106 which rotate the discs 104 to cause them to pick up the number wheels and return them to zero position. Thereafter, the main reset shaft may be again turned to shift the wheel-supporting shafts back to original supporting position, thus conditioning the register for a registering operation.

Although all of the foregoing operations could be carried out manually by direct actuation, it may be preferred to arrange the counter for simple semi-automatic operation.

Turning now to the semi-automatic arrangement for turning the main reset shaft 132 and rotating the gear 130, this is best shown in Figures 1 to 4 and 12 to 15 of the drawings. The outer end of the main reset shaft 132 is provided with a coupling 154 for receiving one end of a connecting shaft 156 which is journaled at its other end by the frame 158 of the gasoline-dispensing apparatus. Fixed to the outer end of the connecting shaft 156 is a lever 160 connected at its outer end to a connecting rod 162 (Figures 1 and 2) which in turn is connected to a plate 164 fixed to a stub shaft 166 journaled in the frame 158 and outer casing 159 and having on its outer end a handle 168 adapted to be actuated by the operator. For illustrative purposes the horizontal position of the handle shown in Figure 1 is denoted as that when the apparatus is in condition for a dispensing operation. When the handle is turned by the operator in a clockwise direction as viewed in Figure 1 to a vertical position or a movement of approximately 90°, a similar turning movement will be applied through the linkages mentioned to the main reset shaft 132, thereby causing shifting of the wheel-supporting shafts to resetting position. Conversely, when the handle is returned to horizontal position, the resulting movement will cause the wheel-supporting shafts to be shifted to registering position.

In the preferred embodiment, the handle 168 is also utilized to turn on and off the pump motor switch (not shown in the drawings). For this purpose, the plate 164 is provided with an arcuate slot 170 for accommodating the end 172 of a connecting rod 178 which in turn is connected to the pump motor switch. The slot 170 is formed so that, when the handle is in the horizontal position shown in Figure 1 of the drawings, the connecting rod 178 is held in such position that the pump motor switch is closed and then, when the handle is turned in a clockwise direction to the vertical position, the connecting rod 178 is moved downwardly to open the pump motor switch. The slot 170 provides a lost motion connection which insures that a full throw of the handle 168 will be required in order to actuate the switch, although with some types of switches, the toggle arrangement of the switch may inherently necessitate a full throw of the handle 168 and make the slot 170 unnecessary.

Turning now to Figures 3, 4 and 12–14, it will be seen that the resetting gear 130 is rotatably mounted on a hub 131 which in turn is rotatably mounted on the reset shaft 132 between the coupling 154 and the side plate 10. Fixed to the coupling 154 is a drive plate 180 which, by reason of such mounting, is adapted to turn with the reset shaft. Immediately behind the drive plate 180 and secured to the hub 131 is a control plate 182. Behind the control plate 182 is a notched disc 184 which is fixed to the gear 130. In the specific embodiment, the notched disc 184 is, in fact, made integral with the resetting gear 130.

Pivoted on the outer face of the control plate 182 adjacent the periphery thereof is a drive pawl 186, which is biased in a clockwise direction by means of a spring 188. The drive pawl 186 has a nose portion 187 which is adapted to cooperate with a shoulder 190 on the drive plate 180. Consequently, when the apparatus is in the position shown in Figure 4, which is the position at the end of a dispensing operation, the turning off of the pump motor by movement of the handle 168 will cause counterclockwise movement of the shaft 132 and drive plate 180 and, by engagement of the drive pawl 186 with the shoulder 190, will cause similar counterclockwise movement of the control plate 182. This turning movement is continued by the operator until the drive plate 180 is moved sufficiently so that the nose of a latching pawl 192 will fall into the notch 194 in the drive plate 180. This is the position shown in Figure 12 of the drawings. As a safety measure, an additional notch 196 is cut in the drive plate 180 in advance of the notch 194 so that, in the event the operator succeeds in turning off the motor without fully cocking the apparatus, he will be prevented from returning the handle to the "on" position. As will be realized, the engagement of the latching pawl 192 in either the notch 194 or notch 196 will prevent reverse turning of the drive plate 180 and hence the handle 168 to the horizontal position, turning on the pump motor.

On the inner side of the control plate 182 there is pivoted a second drive pawl 200, the pawl 200 being pivoted in a clockwise direction into engagement with the notched disc 184 by a spring 202. The direction in which the pawl 200 faces is such that, when the control plate 182 is rotated in a counterclockwise direction in the manner just described, the nose of the pawl 200 will merely ratchet over the edge of the notched disc 184 and will impart no movement thereto. To insure that no movement will be imparted to the notched disc 184 by reason of the drag of the pawl 200, there is provided a combination stop and no-back pawl 204 pivoted at 206 on the frame and biased into engagement with the notched disc 184 by means of a spring 208.

Figure 4:
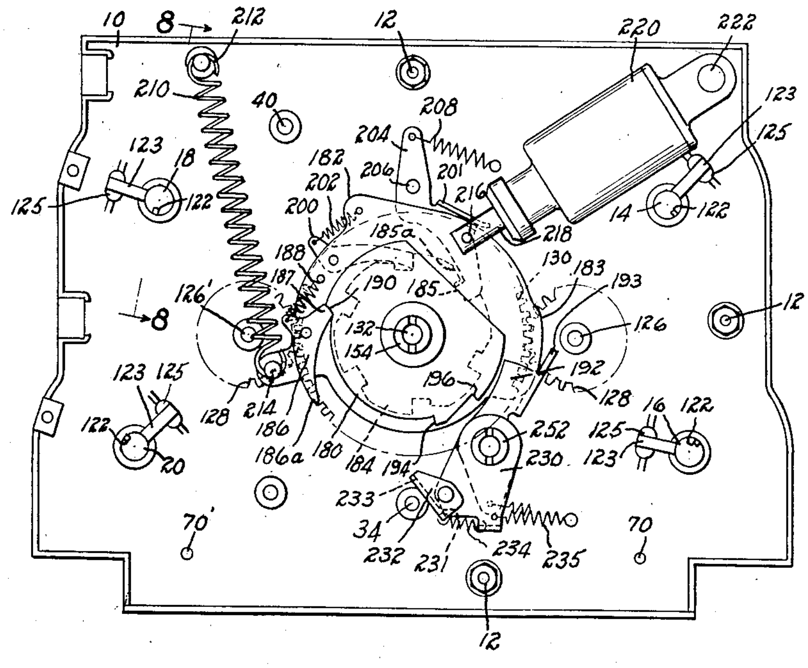
Figure 4 is a side view thereof with the casing removed, the moving parts thereof being shown in the position which they assume when a dispensing operation is initiated.

The control plate 182 is urged in a clockwise direction by means of a relatively heavy spring 210, which is connected at one end 212 to the side plate 10 and which is connected at its other end to a projection 214 on the control plate 182. Also connected to the control plate 182 at 216 is the plunger 218 of a dashpot 220 which is pivotally connected at its outer end 222 to the side plate 10. The dashpot 220 is preferably of a type which will provide a uniform checking action throughout its stroke. The arrangement is such that the dashpot will control the speed of rotation of the control plate 182 in a clockwise direction but will provide little opposition to rotation of the control plate in the opposite or counterclockwise direction. Assuming that the control handle 168 is in the horizontal position shown in Figure 1, which is the position during a dispensing operation with the pump motor switch turned on, then the parts of the resetting mechanism described immediately above will be in the position shown in Figure 4 of the drawings. It thus will be apparent that, when the operator returns the handle 168 to the vertical position which will turn off the pump motor, then the parts of the resetting mechanism referred to will be moved to the position shown in Figure 12 of the drawings. In this position the drive plate 180 has been turned sufficiently to cause it to be latched by the latching pawl 192, thus preventing the operator from turning the handle 168 in a reverse direction to again turn on the motor. During the turning of the drive plate 180, the control plate 182 was carried around therewith by reason of the engagement of the drive pawl 186 with the shoulder 190, causing the main spring 210 to be further tensioned and causing the dashpot 220 to be extended. During this operation no movement is imparted to the resetting gear 130 or the notched disc 184, this being effectively prevented by the no-back pawl 204. At the completion of the movement of the parts to the position shown in Figure 12 of the drawings, the no-back pawl 204 is cammed to a partial releasing position. As will be observed, the control plate 182 has an abrupt camming edge 183 which is adapted to engage under a flange 201 on the no-back pawl 204, thus lifting the no-back pawl into the partial releasing position as the mechanism reaches the position shown in Figure 12. As will be noted, the notches 185 of the notched disc 184 have one corner thereof indicated at 185*a* cut away so as to render the notch more shallow on one side than the other. Accordingly, when the no-back pawl 204 is in full latching position as shown in Figure 4 of the drawings, movement of the notched disc 184 in either direction is prevented. However, when the no-back pawl 204 is raised to partial releasing position by the camming action of the camming edge 183, as shown in Figure 12 of the drawings, the notched disc 184 will be released for clockwise movement because of the shallowness of the notch at 185*a*, but will still be prevented from movement in a counterclockwise direction.

Figure 12:
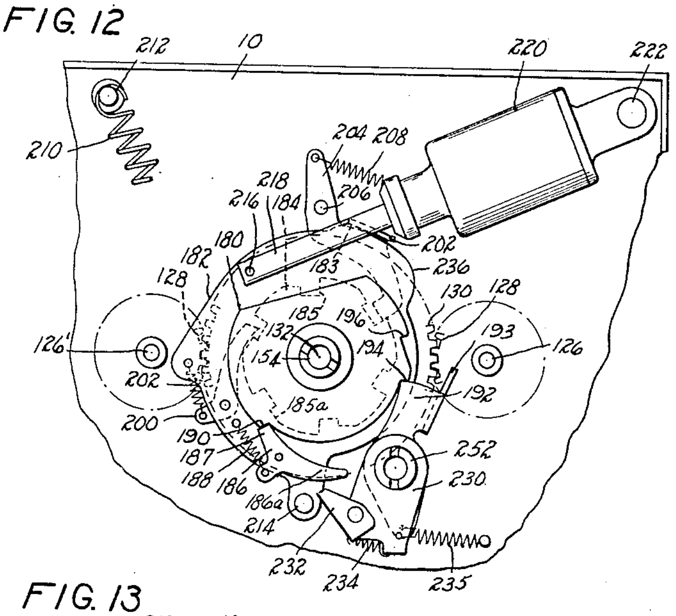
Figure 12 is a fragmentary view similar to Figure 4 showing the moving parts in the position which they assume at the end of a dispensing operation when the pump motor is turned off.

With the apparatus in the position shown in Figure 12 of the drawings, which is the position of the apparatus at the end of a dispensing operation and with the pump motor turned off, the only operation which is open to the operator is to reset the register. In order to initiate a resetting operation, all that is required is to pivot the drive pawl 186 so as to disengage its nose 187 from the shoulder 190 of the drive plate 180. While the exact mechanism for pivoting the pawl 186 to disengaging position may be subject to considerable variation, there is shown for this purpose in the preferred embodiment a pivoted arm 230 which is pivotally mounted on the side plate of the frame and having a pawl 232 mounted for limiting pivoting movement at its outer end, the pawl 232 being biased in a counterclockwise direction by means of a light spring 234. The counterclockwise pivoting of the pawl 232 is limited to the position shown in Figure 12 where it extends beneath the tail 186*a* of the pawl 186 by reason of a flange 233 in the pawl which abuts against the shoulder 231 of the pivoted arm 230. As a result of the mechanism just described, the arm 230 can be pivoted in a clockwise direction to cause the pawl 232 to engage underneath the tail of the pawl 186 and thus disengage it from the driving plate 180. The reason for the use of the pivoted pawl 232 is to prevent breakage in the event the operator has moved the pivot arm 230 into resetting position while he is turning the handle 168 from the horizontal to the vertical position. In that event, the pawl 232 would be in the path of the tail 186*a* of the drive pawl 186, but would be cammed harmlessly out of the way, and of course, upon return of the arm 230 to original position, the pawl 232 would then become operative by engaging underneath the tail of the pawl. The lever arm 230 is biased in a counterclockwise direction by means of a spring 235.

The arm 230 may be pivoted to initiate a resetting operation in any desired way to meet the convenience of the operator. If desired, the arm 230 may be connected with the hose nozzle support (not shown) so as to cause automatic resetting whenever the hose nozzle is removed from the support. In the preferred embodiment shown in the drawings, however, an independent agency is utilized to operate the pivot arm 230, and this comprises a push button 240 which is mounted for reciprocation in the outer casing of the pump housing. The inner end of the push button 240 abuts against one end of an L-shaped lever 242 which is pivoted at its other end on the bracket 244 and which is connected intermediate its ends to the connecting rod 246. The lower end of the connecting rod 246 is connected to a lever 248 which is fixed to the shaft 250. The shaft 250 is journaled at one end in the frame and has its other end received in a coupling 252 secured to the arm 230. As a result of this arrangement, the push button may be pushed inwardly of the casing to pivot the lever 230 in a clockwise direction to disengage the drive pawl 186 and upon release the push button is returned to original position as is the lever arm 230 by reason of the spring 235.

Turning now to the resetting operation which takes place upon the disengagement of the pawl 186 from the driving plate 180, it will be seen that immediately upon release of the pawl 186 the control plate 182 is free to rotate in a clockwise direction under the influence of the heavy spring 210 at a speed controlled by the dashpot 220. Such clockwise rotation of the control plate 182 will cause a concurrent rotation of the notched disc 184 because of the driving action of the second drive pawl 200 which is in engagement with one of the notches 185 of the notched disc 184. This concurrent movement of the notched disc 184 will not be prevented by the no-back pawl 204, because as previously mentioned, this pawl has been disengaged to releasing position by the cam shoulder 183 of the control plate 182. Upon partial movement of the control plate 182 and the notched disc 184 therewith, the no-back pawl 204 is again free to lock the disc 184 against movement, which it does as soon as disc 184 has rotated far enough to bring the next notch 185 into registry therewith, which occurs at the completion of the necessary amount of turning to effect complete resetting. In the specific embodiment, the distance between notches 185 is approximately 60°, which provides sufficient rotation of the resetting gear 130 which is integral with and rotates with the notched disc 184 to complete a resetting operation. At the completion of the resetting operation the parts will be in the position shown in Figure 13 of the drawings.

Figures 13, 14, 15:
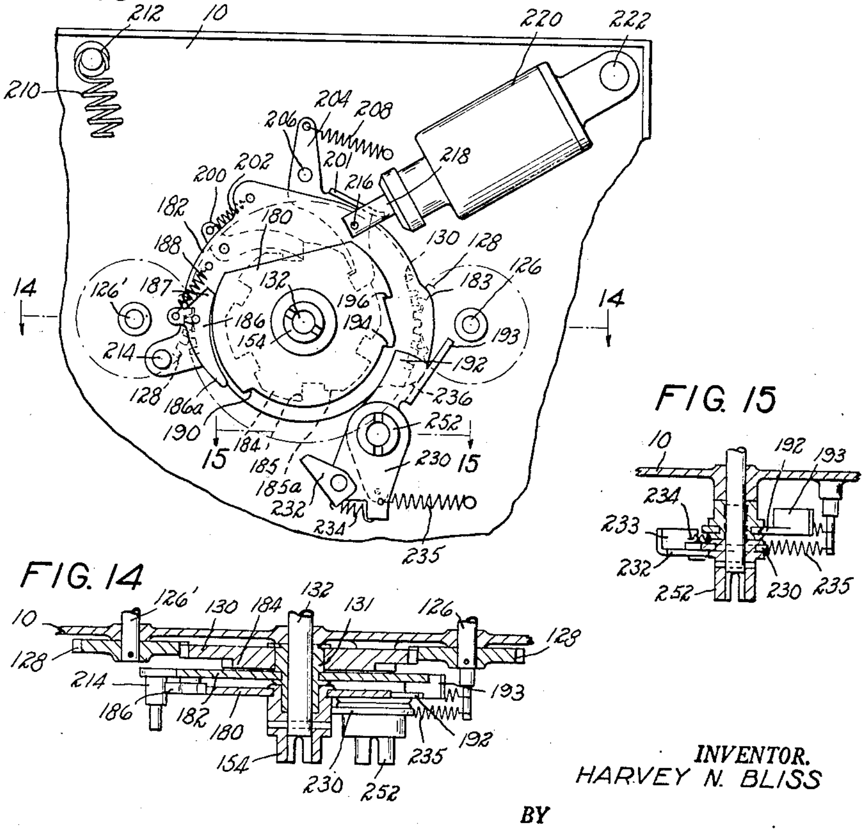
Figure 13 is a similar fragmentary view showing the moving parts in the position which they assume at the end of a resetting operation and before the motor is turned on for a subsequent dispensing operation.
Figure 14 is a cross-sectional view taken along the line 14—14 of Figure 13.
Figure 15 is a cross-sectional view taken along the line 15—15 of Figure 13.

Upon return of the apparatus to the position shown in Figure 13 which is the completion of a resetting operation, the latching pawl 192 is disengaged from the notch 194 of the drive plate 180 by reason of the camming edge 236 of the control plate 182 which engages against the flange 193 of the latching pawl 192 and thereby cams the pawl 192 in a clockwise direction to disengaging position. Since the latching pawl 192 is now disengaged from the driving plate 180, the operator is then permitted to turn the handle 168 from vertical to the horizontal position shown in Figure 1 to turn on the pump motor which, of course, returns the mechanism to the position shown in Figure 4 of the drawings. In this position the drive pawl 186 is re-engaged with the shoulder 190 of the driving plate 180 and by reason of the rotation of the reset shaft during turning movement of handle 168 the wheel-supporting shafts are shifted to re-engage the number wheels with their driving gears, thus conditioning the apparatus for a dispensing operation.

While it is believed that the operation of the register will be apparent from the foregoing description, the following recapitulation of an operating cycle may be helpful in an understanding of the invention. For purposes of discussion, it will be assumed that a dispensing operation has been completed and the register has been reset to zero and the pump motor is turned off. This is the condition of the apparatus as shown in Figure 13 of the drawings. In order to carry out a subsequent dispensing operation, all that it is necessary for the operator to do is to turn the handle from vertical to horizontal position, which will move the parts to the position shown in Figure 4 of the drawings. The movement of the parts which takes place is, of course, the turning movement of the reset shaft 132, which in turn shifts the wheel-supporting shafts to registering position. At the same time, the drive plate 180 is rotated to engage the shoulder 190 on the pawl 186. When the apparatus is in this condition, i. e., during a dispensing operation, it is impossible to reset the register, since the spring 210 is not loaded, the notched disc 184 is held by the pawl 204, and, in any event, the shifted position of the wheel-supporting shafts is such that the resetting mechanism is inoperable. At the end of the dispensing operation, the only action which the operator can take is to return the handle to the vertical position to turn off the pump motor. When he does this, the turning of the handle will move the parts to the position shown in Figure 12 of the drawings. During the course of this movement, the drive plate and control plate 182 are rotated in unison in a counterclockwise direction through the pawl 186 to load the spring 210, and the plate 182 is thereupon retained in loaded position by the automatic action of the latching pawl 192. At the end of the movement, the second driving pawl 200 falls into a notch 185 of disc 184 and pawl 204 is cammed to releasing position by cam surface 183. The turning of the main reset shaft 132 which accompanies the turning of the lever 180 shifts the wheel-supporting shafts to resetting position. With the apparatus in the position shown in Figure 12 of the drawings, the operator is prevented from again turning on the pump motor because of the engagement of the latching pawl 192 with the shoulder 194 of drive plate 180. Therefore, the only operation that the operator is permitted to carry out is a resetting operation which, as previously described, is accomplished by pushing in on the reset button 240 which disengages the pawl 186 from the plate 180. Immediately upon the release of the control plate 182 in this fashion, the spring 210 under control of dashpot 220 rotates the control plate 182 in a clockwise direction to the position shown in Figure 13 of the drawings. Since control plate 182 when moving in a clockwise direction also drives the notched disc 184 through the pawl 200, this causes turning of the resetting gear 130, which movement automatically resets the number wheels to zero. At the completion of this resetting movement, the shoulder 236 of control plate 182 cams out the latching pawl 192, thereby freeing the driving plate 180. Thus, at the end of the resetting operation, the operator may again turn on the pump motor which moves the apparatus to the position shown in Figure 4 of the drawings, as previously described.

Because of the improved and efficient construction of the counter or register in accordance with the invention, it is a particular advantage that the energy required for the complete resetting of the number wheels to zero, even when employing many sets of number wheels, is materially reduced. As a result, the energy requirement can be supplied merely by turning a relatively short handle 168 through a small angle by the application of a force well within the capabilities of the average operator.

It thus will be seen that there has been provided, in accordance with the invention, a counter or register of improved construction having many advantages from an operational standpoint, which is particularly adapted for commercial manufacture and use, and which will afford speed and simplicity of control compatible with accuracy and dependability.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a counter, an axially movable shaft, a number wheel rotatably mounted on the shaft, a driven gear for rotating the number wheel during a counting operation, a resetting gear for resetting the number wheel to zero, shiftable means actuated by said shaft for connecting the number wheel selectively with the driven gear and the resetting gear, and means for driving the resetting gear when the shiftable means is connected to said resetting gear.

2. In a counter, an axially movable but non-rotatable shaft, a number wheel rotatably mounted on the shaft, a driven gear disposed at one side of the wheel for rotating the number wheel during a counting operation, a rotatable member disposed at the other side of the wheel for resetting the number wheel to zero, and means shiftably mounted on the number wheel and actuatable by the shaft for connecting the number wheel selectively with the driven gear and the rotatable member.

3. In a counter, an axially movable shaft, a number wheel rotatably mounted on the shaft, a driven gear disposed at one side of the wheel for rotating the number wheel during a counting operation, a resetting gear disposed at the other side of the wheel for rotating the number wheel during a resetting operation, and means for selectively connecting the number wheel to the driven gear and resetting gear including a displaceable element in the number wheel actuatable by the shaft.

4. In a counter, an axially shiftable shaft, a number wheel rotatably mounted on the shaft, a rotatable driven gear coaxially disposed at one side of the wheel for rotating the number wheel during a counting operation, a rotatable member coaxially disposed at the other side of the wheel for rotating the number wheel during a resetting operation, displaceable pawl means mounted in the number wheel normally connecting the number wheel to the driven gear and shiftable with the shaft to a position disconnecting the number wheel from the driven gear and connecting the number wheel to the rotatable member, and means for disconnecting the number wheel from the rotatable member and retaining the number wheel in zero position.

5. In a counter, an axially shiftable shaft, a number wheel rotatably mounted on the shaft, a rotatable member coaxially disposed at one side of the number wheel for rotating the number wheel during a resetting operation, a shiftable element in the number wheel engageable with the rotatable member to connect the number wheel with the rotatable member, a shoulder on the shaft for shifting the shiftable element into engagement with the rotatable member when the shaft is shifted axially, and a notch in said shoulder for receiving the shiftable element to disengage the shiftable element from the rotatable member and retain the number wheel in zero position.

6. In a counter, an axially shiftable but non-rotatable shaft, a number wheel rotatably mounted on the shaft, a rotatable member coaxially disposed at one side of the number wheel for rotating the number wheel during a resetting operation, a shiftable element in the number wheel engageable with the rotatable member to connect the number wheel with the rotatable member, means on the shaft for shifting the shiftable element into engagement with the rotatable member when the shaft is shifted axially, means for rotating the rotatable member in excess of one revolution, and means on the shaft engageable with the shiftable element to simultaneously lock the wheel in zero position and disengage the shiftable element from the rotatable member.

7. In a counter, an axially shiftable but non-rotatable shaft, a number wheel rotatably mounted on the shaft, a rotatable member coaxially disposed at one side of the number wheel for rotating the number wheel during a resetting operation, a pawl pivotally mounted in the number wheel for pivoting movement in an axial plane and having means for engaging the rotatable member, a shoulder on the shaft engageable with the pawl to shift the pawl into engagement with the rotatable member when the shaft is shifted axially, means for rotating the rotatable member in excess of one revolution, and a notch in said shoulder disposed to receive the pawl when the number wheel is in zero position to retain the number wheel in zero position and disengage the pawl from the rotatable member.

8. In a counter, a frame, a plurality of axially shiftable but non-rotatable shafts mounted in the frame in parallel arrangement, a number wheel rotatably mounted on each of said shafts, a rotatable resetting member on each of said shafts, means for simultaneously rotating said members, a shiftable element in each number wheel engageable with the rotatable member, means on the shafts for shifting the elements into engagement with the rotatable members when the shafts are shifted, means for simultaneously shifting the shafts, and means on the shaft cooperating with the shiftable element when the shaft is shifted and the number wheel is in zero position for locking the number wheel in zero position and disengaging the shiftable element from the rotatable member.

9. In a counter, a frame, a pair of axially shiftable parallel shafts mounted at different elevations in said frame but in disalignment vertically, a number wheel rotatably mounted on each of said shafts, a rotatable resetting member rotatably mounted on each shaft, means for simultaneously rotating said members, a shiftable element in each number wheel engageable with the rotatable member, means on the shafts for shifting the elements into engagement with the rotatable members when the shafts are shifted, and means for simultaneously shifting the shafts.

10. The mechanism defined in claim 9 wherein the means for simultaneously shifting the shafts comprises a rotatable rod extending between the shafts, a slide mounted on the frame for horizontal sliding movement, and a connection between the slide and rod comprising a generally tooth-shaped pawl on the rod extending into a notch in the slide, the side edges of the notch extending substantially parallel to the rod.

11. In a counter, a shaft, a number wheel rotatably mounted on the shaft, a rotatable disc-like element coaxially disposed at one side of the wheel and mounted for rotation relative to the shaft for rotating the number wheel during a resetting operation, a connecting element mounted for movement in the number wheel in a direction axially of the wheel, and means for biasing the connecting element toward the disc-like element during a resetting operation, said disc-like element having a shoulder for engaging the connecting element.

12. In a counter, an axially shiftable shaft, a number wheel rotatably mounted on the shaft, a rotatable disc-like element coaxially disposed at one side of the wheel and mounted for rotation relative to the shaft for rotating the number wheel during a resetting operation, a plunger mounted in the number wheel for sliding movement in a direction axially of the wheel, and means responsive to axial movement of the shaft for biasing the plunger toward the disc-like element during a resetting operation, said disc-like element having an opening for reception of the plunger.

13. In a counter, an axially shiftable shaft, a number wheel rotatably mounted on the shaft, a rotatable disc-like element coaxially disposed at one side of the wheel for rotating the number wheel during a resetting operation, a plunger mounted in the number wheel for sliding movement in a direction axially of the wheel, means for biasing the plunger toward the disc-like element during a resetting operation including a pawl mounted in the number wheel for pivoting movement in an axial plane and a shoulder on the shaft engaging the pawl when the shaft is shifted axially, said disc-like element having a hole for reception of the plunger and said shoulder having a notch for accommodating the pawl when the number wheel is in zero position.

14. In a counter, an axially shiftable shaft, a number wheel rotatably mounted on the shaft, a rotatable disc-like element coaxially disposed at one side of the wheel having a plurality of circularly disposed holes, means for rotating the disc-like element during a resetting operation, a plunger slidably mounted in the number wheel for engagement with one of said holes, and means for biasing the plunger toward the disc-like element during a resetting operation and for withdrawing it from the element during a counting operation comprising a pawl mounted in the number wheel for swinging movement in an axial plane, a lost-motion connection between the pawl and the plunger including a spring urging the pawl toward the disc-like element, a shoulder on the shaft engageable with the pawl to pivot it toward the disc-like element when the shaft is shifted, said shoulder having a slot to accommodate the pawl when the number wheel is in zero position, and a spring biasing the pawl into said slot.

15. In a counter, an axially movable shaft, a number wheel rotatably mounted on the shaft, a rotatable member coaxially disposed at one side of the wheel for rotating the number wheel during a resetting operation, a plunger mounted in the number wheel for sliding movement in a direction axially of the wheel, and means responsive to axial movement of the shaft for biasing the plunger toward the rotatable element, said plunger having a beveled nose portion and said rotatable member having a frusto-conical opening for receiving the beveled end portion of the plunger.

16. In a counter, an axially movable shaft, a number wheel rotatably mounted on the shaft, a driven gear coaxially disposed at one side of the wheel for rotating the wheel during a counting operation, a rotatable disc-like element coaxially disposed at the other side of the wheel for rotating the wheel during a resetting operation, said disc-like element having a series of holes circularly arranged therein, a pair of pawls pivotally mounted in the number wheel for swinging movement in an axial plane, said pawls being biased toward the driven gear, one of said pawls having means normally engaging the driven gear in driving relationship, a shoulder on the shaft for pivoting the pawls away from the driven gear when the shaft is shifted, a plunger slidably mounted in the number wheel for movement toward and away from the disc-like element and engageable in one of said holes, a spring urging the plunger toward the disc-like element, and means on the other of said pawls normally disengaging the plunger from the disc-like element.

17. In a counter, an axially movable shaft, a number wheel rotatably mounted on the shaft, a driven gear coaxially disposed at one side of the wheel for rotating the wheel during a counting operation, a rotatable disc-like element coaxially disposed at the other side of the wheel for rotating the wheel during a resetting operation, said disc-like element having a series of holes circularly arranged therein, a pair of pawls pivotally mounted in the number wheel for swinging movement in an axial plane, a spring biasing each of the pawls toward the driven gear, interengaging teeth on the driven gear and one of said pawls, a shoulder on the shaft for pivoting the pawls away from the driven gear when the shaft is shifted, a plunger slidably mounted in the number wheel for movement toward and away from the disc-like element and engageable in one of said holes, a spring urging the plunger toward the disc-like element, and interengaging shoulders on the plunger and the other of said pawls for withdrawing the plunger from the disc-like element when the other pawl is pivoted toward the driven gear, said shoulder having a slot to accommodate the said other pawl when the number wheel is in zero position.

18. In a counter, an axially movable shaft, a number wheel rotatably mounted on the shaft, a driven gear disposed at one side of the wheel for rotating the wheel during a counting operation, a rotatable disc-like element coaxially disposed at the other side of the wheel for rotating the wheel during a resetting operation, a first pawl mounted in the number wheel for pivoting movement in an axial plane, a plunger carried by the pawl for movement axially of the wheel, said rotatable disc-like element having a seat for receiving said plunger, a second pawl normally engaging the driven gear mounted in the number wheel for pivoting movement in an axial plane, and a shoulder on the shaft for pivoting the first pawl toward the disc-like element and its second pawl away from the driven gear when the shaft is shifted, said pawls having surfaces for engagement by the shoulder with the said surface of the first pawl disposed in retard of the said surface of the second pawl so that upon shifting of the shaft the second pawl is disengaged from the driven gear before the first pawl and plunger are moved toward the disc-like element.

19. In a counter, an axially shiftable shaft, a number wheel rotatably mounted on the shaft, a rotatable driven gear coaxially disposed at one side of the wheel, a rotatable resetting gear coaxially disposed at the other side of the wheel, pawl means in the number wheel normally engaging the driven gear and shiftable by axial movement of the shaft into engagement with the resetting gear, and means for concomitantly shifting the shaft and rotating the resetting gear to zeroize the number wheel.

20. In a counter, an axially shiftable shaft, a number wheel rotatably mounted on the shaft, a rotatable driven gear coaxially disposed at one side of the wheel, a rotatable resetting gear coaxially disposed at the other side of the wheel, pawl means in the number wheel normally engaging the driven gear and shiftable by axial movement of the shaft into engagement with the resetting gear, a spring operatively connected to the resetting gear to turn the resetting gear in one direction, manually operable means to load the spring, and means to maintain the shaft in shifted position during movement of the gear in said one direction.

21. In a counter, an axially shiftable shaft, a number wheel rotatably mounted on the shaft, a rotatable driven gear coaxially disposed at one side of the wheel, a rotatable resetting gear coaxially disposed at the other side of the wheel, pawl means in the number wheel normally engaging the driven gear but shiftable upon axial movement of the shaft into engagement with the resetting gear, a gear train connected to the resetting gear, a spring for driving the gear train in one direction, manually operable means for loading the spring, normally releasable means to latch the gear train against movement by the spring, and means to shift the shaft during loading of the spring.

22. In a liquid dispensing mechanism, a counter having resetting means, a spring for actuating the resetting means, a pump motor switch, and means for simultaneously loading the spring and opening the pump motor switch.

23. In a liquid dispensing mechanism, a counter having resetting means, a movable member engageable with the resetting means, a spring anchored at one end and operatively connected at the other end to the movable member, a pump motor switch, actuating means for opening and closing the pump motor switch, and means associated with the actuating means for moving the movable member to load the spring when said actuating means is moved to switch open position.

24. In a liquid dispensing mechanism, a counter having resetting means, a movable member engageable with the resetting means, a spring anchored at one end and operatively connected at the other end to the movable member, a pump motor switch, actuating means for opening and closing the pump motor switch, means associated with the actuating means for moving the pivoted member from an original position to load the spring when said actuating means is moved to switch open position, a manually releasable latch for holding the movable member in spring-loaded position, a latch for holding the actuating means in switch open position, and means associated with the movable member for unlatching the last-named latch when the movable member is returned by the spring to original position.

25. In a liquid dispensing mechanism, a counter having rotatable resetting means, a spring biased actuating member engageable with the resetting means, a pump motor switch, manual means for concomitantly retracting the member and closing the motor switch, and a manually releasable latch for holding the member in retracted position.

26. In a liquid dispensing mechanism, a counter having rotatable resetting means, a member mounted for oscillating movement, means connecting the oscillating member to the resetting means when the oscillating member is moved in one direction, a spring urging the member in said one direction, a pump motor switch, a manually operable handle for concomitantly opening the motor switch and moving said member in the opposite direction to load the spring, a manually releasable latch for holding the member in spring loaded position, and a latch releasable upon return of the member to initial position for holding the handle in switch open position.

27. In a liquid dispensing mechanism, a counter having an axially movable shaft, a number wheel rotatably mounted on the shaft, a rotatable driven gear coaxially disposed at one side of the wheel, a resetting gear coaxially disposed at the other side of the wheel, pawl means in the number wheel normally engaging the driven gear and shiftable by axial movement of the shaft into engagement with the resetting gear, a gear train connected to the resetting gear, a spring for driving the gear train in one direction, a pump motor switch, manually operable means for actuating the switch, and means connected to the manually operable means for loading the spring and for shifting the shaft when the pump motor switch is closed.

28. In a liquid dispensing mechanism, a counter having an axially movable shaft, a number wheel rotatably mounted on the shaft, a rotatable driven gear coaxially disposed at one side of the wheel, a resetting gear coaxially disposed at the other side of the wheel, pawl means in the number wheel normally engaging the driven gear and shiftable by axial movement of the shaft into engagement with the resetting gear, a gear train connected to the resetting gear, a spring connected to the gear train for driving the gear train in one direction, manually operable means for loading the spring and for shifting the shaft, a manually releasable latch for retaining the gear train in spring-loaded condition, a pump motor switch connected to the manually operable means whereby the switch is opened when the spring is loaded, and a latch for retaining the manually operable means in switch open position which latch is automatically released upon completion of a resetting operation.

29. In a liquid dispensing mechanism, a counter having resetting means, a member mounted for oscillating movement, a spring connected to the member for driving it in one direction, a one-way clutch between the member and said resetting means to cause the member to drive the resetting means when the member is oscillated in said one direction, manually movable means, and a one-way clutch between the last-named means and the member for driving the member in the opposite direction to load the spring.

30. In a liquid dispensing mechanism, a counter having resetting means, a member mounted for oscillating movement, a spring connected to the member for driving it in one direction, a one way clutch between the member and said resetting means to cause the member to drive the resetting means when the member is oscillated in said one direction, manually movable means, a one-way clutch between the last-named means and the member for driving the member in the opposite direction to load the spring, and releasable means for latching the member in spring loaded position.

31. In a liquid dispensing mechanism, a counter having resetting means, a rotatable notched disc operatively connected to the resetting means, a rotatable control plate mounted coaxially with the notched disc, a spring for driving the control plate in one direction, a pawl associated with the notched disc and control plate for driving the notched disc when the control plate is rotated in said one direction, a rotatable drive plate mounted coaxially with the control plate and notched disc, a drive pawl associated with the control plate and drive plate for driving the control plate in the opposite direction when the drive plate is rotated in said opposite direction, first manually operable means to rotate the drive plate in said opposite direction, and second manually operable means to release the last-named pawl.

32. The mechanism defined in claim 31 wherein the said second manually operable means comprises a movable member having a projection thereon for engaging the said drive pawl, said projection being mounted for limited pivotal movement in the orbit of the pawl.

33. In a liquid dispensing mechanism, a counter having an axially movable shaft, a driven gear for rotating the number wheel during a counting operation, a resetting gear for resetting the number wheel to zero, shiftable means in the wheel actuated by said shaft for connecting the number wheel selectively with the driven gear and the resetting gear, manually operable means connected to the shaft selectively movable between a first position in which the shaft is shifted to connect the wheel with the driven gear and a second position in which the shaft is shifted to connect the wheel with the resetting gear, means for driving the resetting gear including a spring, connecting means between the last-named means and the manually operable means to load the spring when the manually operable means is moved to said second position, a manually releasable latch for preventing movement of the resetting means by the spring, a latch for preventing movement of the manually operable means from the second position to the first position and means for releasing the last-named latch, conditioned for operation by release of the first-named latch.

References Cited in the file of this patent

UNITED STATES PATENTS 2,568,709 Bliss ------------------ Sept. 25, 1951